US012085271B2

(12) United States Patent
Jiang (10) Patent No.: US 12,085,271 B2
(45) Date of Patent: Sep. 10, 2024

(54) WATERPROOF LIGHT HEAD STRUCTURE

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/175,719

(22) Filed: Feb. 28, 2023

(65) Prior Publication Data

US 2024/0219019 A1 Jul. 4, 2024

(30) Foreign Application Priority Data

Dec. 30, 2022 (CN) ......................... 202223609183.6

(51) Int. Cl.
*F21V 31/00* (2006.01)
*F21V 15/01* (2006.01)
*F21V 19/00* (2006.01)

(52) U.S. Cl.
CPC ............ *F21V 31/005* (2013.01); *F21V 15/01* (2013.01); *F21V 19/00* (2013.01)

(58) Field of Classification Search
CPC ......... F21V 31/005; F21V 15/01; F21V 19/00
See application file for complete search history.

(56) References Cited

U.S. PATENT DOCUMENTS

| 8,770,785 | B2* | 7/2014 | Vermeland | F21V 31/005 362/217.05 |
| 10,962,215 | B2* | 3/2021 | Jiang | F21V 29/89 |
| 11,060,713 | B2* | 7/2021 | Jiang | H05K 7/20263 |
| 2010/0061100 | A1* | 3/2010 | Quadri | F21S 10/007 362/293 |
| 2019/0049103 | A1* | 2/2019 | Jiang | F21V 29/763 |
| 2019/0137090 | A1* | 5/2019 | Jiang | F21V 15/01 |
| 2019/0219249 | A1* | 7/2019 | David | H05B 45/20 |
| 2020/0103097 | A1* | 4/2020 | Kinzer | F21V 13/04 |
| 2020/0191362 | A1* | 6/2020 | Kopeckova | F21V 21/15 |
| 2021/0095834 | A1* | 4/2021 | Jiang | F21V 21/15 |
| 2021/0131657 | A1* | 5/2021 | Jiang | F21V 21/30 |
| 2021/0396305 | A1* | 12/2021 | Jiang | F16H 55/18 |

FOREIGN PATENT DOCUMENTS

CN 111197722 A * 5/2020

* cited by examiner

*Primary Examiner* — Tsion Tumebo
(74) *Attorney, Agent, or Firm* — MUNCY, GEISSLER, OLDS & LOWE, P.C.

(57) ABSTRACT

A waterproof light head structure includes a main bracket, a front cover and a rear cover respectively arranged on the front side and the rear side of the main bracket, an upper plate arranged above the main bracket, a bottom plate arranged below the main bracket, a lens assembly arranged on the main bracket via the upper plate, and a light source arranged in the main bracket. The main bracket is arranged in a cavity formed by joining the front cover and the rear cover. The front cover and the rear cover are respectively in sealed connection with the upper plate and the bottom plate, and the side edges where the front cover and the rear cover are joined are in sealed connection to form an all-around waterproof structure. The waterproof light head according to the present invention is simple in structure, while the waterproof performance is guaranteed.

18 Claims, 6 Drawing Sheets

WATERPROOF LIGHT HEAD STRUCTURE

CROSS REFERENCE TO RELATED APPLICATIONS

The present application claims priorities from Chinese Application No. 202223609183.6 filed on Dec. 30, 2022, all of which are hereby incorporated herein by reference.

TECHNICAL FIELD

The present invention relates to the technical field of stage lights, and more particularly, relates to a waterproof light head structure.

BACKGROUND

Stage lights are often used to render the atmosphere on the stage with colorful and changeable colors. Because of characteristics of real-time positioning, flexible steering and controllable color mixing, the stage lights are widely used, such as in parties, concerts, outdoor performances, urban lighting projects, entertainment places, building decoration and other fields. Therefore, in order to demand the wide use in various occasions, especially in the outdoor or relatively wet places, the stage light needs to have good waterproof performance for normal and long-term use.

The conventional waterproof light head of the stage light is commonly constructed in two ways. In a first way, a light main body is sleeved with a barrel-shaped housing on the outside, and the two ends of the barrel-shaped housing are to be closed in a sealed method, thereby realizing a light head structure having waterproof performance. Although such type of structure has the waterproof performance, it is very inconvenient to mount and maintain. In another way, left and right side plates of a light head bracket serve as parts of a housing of the light head, a front cover and a rear cover of the light head and the left and right side plates of the light head bracket are spliced into the complete housing, in order to achieve the waterproof performance, the front cover needs to be tightly fixed to the side plate and the rear cover needs to be tightly fixed to the side plate, in such configuration, the left and right side plates of the light head bracket bear force front and back, thus forming the waterproof complete housing. However, most of assemblies inside the light head are also mounted on the left and right side plates of the light head bracket, and the overall structure of the waterproof light head thus is more complex, such configuration also causes inconvenience during mounting and maintaining. In addition, due to the high coupling performance of the structure and matching conditions required to make the existing light head waterproof, the existing types of light heads are usually only used as waterproof lights in form of complete structure and cannot combine the advantages of non-waterproof lights. That is, the existing waterproof light cannot be converted to a non-waterproof light with little change.

Therefore, there is an urgent need for an improved waterproof light head structure to overcome the shortcomings of waterproof light heads in the prior art.

SUMMARY

In view of this, the present invention provides a waterproof light head structure which can achieve a waterproof performance and is convenient to mount and maintain, as well as being applied in a wide range of scenarios.

According to the present invention, the waterproof light head structure includes a main bracket, a front cover and a rear cover respectively arranged on the front side and the rear side of the main bracket, an upper plate arranged above the main bracket, a bottom plate arranged below the main bracket, a lens assembly mounted on the main bracket via the upper plate, a light source arranged in the main bracket. The front cover (200) and the rear cover (300) are joined to form a cavity, the main bracket is arranged in the cavity. The front cover and the rear cover are respectively in sealed connection with the upper plate and the bottom plate, and the side edges where the front cover and the rear cover are joined are in sealed connection to form an all-around waterproof structure.

In the present invention, the upper plate is connected to the top end of the main bracket, the bottom plate is connected to the bottom end of the main bracket, the upper plate and the bottom plate are also located in the cavity formed by joining the front cover and the rear cover. When the front cover and the rear cover are joined, the front cover and the rear cover surround the upper plate and are in sealed connection with the upper plate at the upper portion of the light head, the front cover and the rear cover surround the bottom plate and are in sealed connection with the bottom plate at the lower portion of the light head, and the side edges where the front cover and the rear cover are joined are in sealed connection, thereby forming an all-around waterproof structure formed by the front cover, the rear cover, the upper plate and the bottom plate.

In the process of achieving waterproofing according to the present application, the front cover and the rear cover form a main stressed structure of fastening joint, and waterproofing of the overall structure is completed during the process of joining and fixing the front cover and the rear cover. In such configuration, not only the waterproof performance of the light head structure is guaranteed, but also mounting and disassembling are more convenient and the structure is simple, compared with an existing waterproof light head structure. Importantly, when the front cover and the rear cover are removed, the main bracket and the lens assembly and the light source correspondingly disposed on the main bracket can form a complete non-waterproof light head structure without any influences on use, which can be used as an indoor stage light at this moment, with more convenient to mount, maintain and debug, Therefore, the present invention can combine the advantages of a non-waterproof light. The switching between the waterproof light head and the complete non-waterproof light head can be realized by only replacing and removing the front cover and the rear cover.

According to the present invention, the main bracket includes a support at least for mounting an effect assembly and a focusing total bracket above the support at least for mounting an optical lens assembly, and the focusing total bracket is connected to the upper end of the support. That is, the upper end of the support is connected to the lower end of the focusing total bracket. As the left and right sides of the main bracket itself are not used as a sealed waterproof joint structure, the support and the focusing total bracket thus provide mounting spaces for the effect assembly and the optical lens assembly, which facilitates modularization for elements, the effect assembly and the optical lens assembly thus can be fixedly connected after being mounted and debugged respectively to form the complete main bracket. However, a side plate of a traditional main bracket serves as a part of the housing of the light head, usually all components are mounted on the side plate, so the components cannot be mounted at the same time, one component can just be mounted only after other components are mounted, and disassembling, assembling and maintaining are also complicated. Therefore, such configuration of the main bracket according to the present invention is convenient to efficiently mount and maintain the main bracket, thereby reducing difficulty of maintaining operation.

Preferably, the effect assembly is mounted on the support in a pluggable way. Specifically, the support includes a left support side plate and a right support side plate, and the effect assembly is mounted between the left support side plate and the right support side plate in a pluggable way. Such pluggable way makes mounting more convenient.

According to the present invention, the lens assembly may include a lens module and a lens base plate which are integrated, and the lens base plate of the lens assembly is formed as the upper plate. Alternatively, the lens assembly can only include a lens module, and the lens module is in sealed connection with the upper plate. When the lens assembly is an integrated waterproof lens assembly with the lens base plate, the lens base plate serves as the upper plate, sealing at the end of the lens can also be achieved with the front and rear covers in sealed connection to the lens base plate. In addition, when the lens assembly only includes the lens module mounted on the upper plate, in order to improve the waterproof performance, the lens module is in sealed connection with the upper plate to achieve waterproofing at the end of the lens.

Specifically, a lens module waterproof strip is provided between the connection position of the lens module and the upper plate, and a lens module waterproof strip groove for mounting the lens module waterproof strip is formed in the upper plate or the lens module. The lens module waterproof strip can be of a ring-shaped structure. The lens assembly can further include a lens ring which is fixedly mounted on the upper plate, and an accommodating cavity for the lens module is formed between the lens ring and the upper plate. That is, the lens module is sleeved with the lens ring, and the lower end of the lens ring is fixedly mounted on the upper plate.

According to the present invention, the front cover and the rear cover are in sealed connection with the upper plate by an upper plate waterproof strip.

The upper plate is provided with an upper plate waterproof strip groove to mount the upper plate waterproof strip. The front cover and the rear cover are each provided with a first protruding strip corresponding to the upper plate waterproof strip. The plane of the first protruding strip facing the upper plate waterproof strip forms a waterproof plane of the upper plate, and the waterproof plane of the upper plate is abutted against the upper plate waterproof strip.

Alternatively, it can be arranged that each of the front cover and the rear cover is provided with an upper plate waterproof strip groove corresponding to the upper plate to mount the upper plate waterproof strip, and when the front cover and the rear cover are joined, the upper plate waterproof strips of the front cover and the rear cover are cooperated to enclose the periphery of the upper plate.

In the present invention, the front cover and the rear cover are in sealed connection with the bottom plate by a bottom plate waterproof strip.

Specifically, the bottom plate is provided with a bottom plate waterproof strip groove to mount the bottom plate waterproof strip. The front cover and the rear cover are respectively provided with a second protruding strip corresponding to the bottom plate waterproof strip. The plane of the second protruding strip facing the bottom plate waterproof strip forms a waterproof plane of the bottom plate, and the waterproof plane of the bottom plate is abutted against the bottom plate waterproof strip.

Alternatively, it can also be arranged that each of the front cover and the rear cover is provided with a bottom plate waterproof strip groove corresponding to the bottom plate to mount the bottom plate waterproof strip and when the front cover and the rear cover are joined, the bottom plate waterproof strips of the front cover and the rear cover are cooperated to enclose the periphery of the bottom plate.

According to the present invention, a heat dissipation assembly below the bottom plate can be further included. The bottom plate is in sealed connection with the heat dissipation assembly. The upper plate and the bottom plate each has a light hole, and the light source is mounted on the upper surface of the heat dissipation assembly. Light emitted by the light source thus is output through the light hole of the bottom plate, the light hole of the upper plate and the lens assembly in sequence.

A heat dissipation assembly waterproof strip is further provided between the bottom surface of the bottom plate and the heat dissipation assembly according to the present invention. And in the horizontal direction, the heat dissipation assembly waterproof strip is arranged between the light hole of the bottom plate and the periphery of the bottom plate. The bottom surface of the bottom plate or the upper surface of the heat dissipation assembly is provided with a heat dissipation assembly waterproof strip groove for mounting the corresponding heat dissipation assembly waterproof strip. According to the present invention, the light source is arranged at a position corresponding to the light hole of the bottom plate. The heat dissipation assembly waterproof strip is of a ring-shaped structure and is fixedly connected to the bottom plate via a fixing member, and the fixing member is disposed inside the heat dissipation assembly waterproof strip. The fixing member can include screws. With the configuration of the heat dissipation assembly waterproof strip, a space between the light hole of the bottom plate and the heat dissipation assembly is still sealed, thus ensuring the waterproof performance at the side of the bottom plate.

According to the present invention, a pivot shaft is each mounted on the left and right sides of the main bracket, which is rotatably connected to an external U-shaped frame for driving the whole light head to rotate. The front cover and the rear cover are each provided with an arc-shaped groove corresponding to the respect pivot shaft, and when the front cover and the rear cover are joined, the two arc-shaped grooves are cooperated to form an avoidance hole for the pivot shaft passing. The pivot shafts are especially mounted on both sides of the support, and each pivot shaft is provided with a wire through hole.

Wiring holes are also formed in the left and right sides of the main bracket according to the present invention. The pivot shaft is mounted on the main bracket corresponding to the position of the wiring hole. The wiring hole can facilitate passing wires of elements between the U-shaped frame and the inside of the light head structure. The pivot shaft is in sealed connection with the front cover and the rear cover through a pivot shaft waterproof strip.

Specifically, each arc-shaped groove is provided with an arc-shaped pivot shaft waterproof strip, and when the front cover and the rear cover are joined, the pivot shaft waterproof strips provided on the two arc-shaped grooves are cooperated to enclose the pivot shaft to seal the outside of the pivot shaft.

In an alternative configuration, a ring-shaped pivot shaft waterproof strip is provided outside the pivot shaft, and the pivot shaft is in sealed connection with the front cover and the rear cover via the ring-shaped pivot shaft waterproof strip.

According to the present invention, the side edges where the front cover and the rear cover are fastened to each other are in sealed connection through a side edge waterproof strip.

Specifically, when the front cover and the rear cover are in sealed connection with the upper plate via the upper plate waterproof strip, the side edge waterproof strip is abutted against or is integrally formed with the upper plate waterproof strip. Simultaneously, when the front cover and the rear cover are in sealed connection with the bottom plate through the bottom plate waterproof strip, the side edge waterproof strip is abutted against or is integrally formed with the bottom plate waterproof strip. Further, when the pivot shafts are mounted on the left and right sides of the main bracket and are sealed to the front cover and the rear cover via the pivot shaft waterproof strip, the side edge waterproof strip is abutted against or is integrally formed with the pivot shaft waterproof strip.

When the side edge waterproof strip is abutted against the upper plate waterproof strip, the bottom plate waterproof strip, and/or the pivot shaft waterproof strip, the end of the side edge waterproof strip is compressed and shortened by 1 mm-3 mm compared with that in a non-abutted state.

In the present invention, the edge of the front cover and/or the rear cover is provided with a side edge waterproof strip groove to mount the side edge waterproof strip, and a waterproof plane engaged with the side edge waterproof strip is provided corresponding to the side edge waterproof strip of the rear cover and/or the front cover. There are various ways to arrange the waterproof strip according to the present invention, at least including the following three arrangement.

In a first arrangement, the upper plate waterproof strip surrounding the periphery of the upper plate is mounted in the upper plate waterproof strip groove, and the bottom plate waterproof strip surrounding the periphery of bottom plate is mounted in the bottom plate waterproof strip groove, and the pivot shaft is in sealed connection with the front cover and the rear cover via the separate ring-shaped pivot shaft waterproof strip. In such situation, only the front cover is required to be provided with the side edge waterproof strip groove and the side edge waterproof strip at a position corresponding to the upper plate to a position corresponding to the pivot shaft, and at a position corresponding to the pivot shaft to a position corresponding to the bottom plate, and the rear cover is provided with the waterproof plane corresponding to the side edge waterproof strip.

In a second arrangement, the front cover and the rear cover are each provided with a U-shaped upper plate waterproof strip groove and a U-shaped upper plate waterproof strip, when the front cover and the rear cover are joined, the upper plate waterproof strip completely encloses the periphery of the upper plate. The pivot shaft is in sealed connection with the front cover and the rear cover via the separate ring-shaped pivot shaft waterproof strip. The bottom plate waterproof strip may have the same arrangement as the upper plate waterproof strip. In such situation, the U-shaped upper plate waterproof strip on the front cover and the side edge waterproof strip of the front cover at a position corresponding to the upper plate to a position corresponding to the pivot shaft can be of an integrated structure. The U-shaped bottom plate waterproof strip on the front cover and the side edge waterproof strip of the front cover at a position corresponding to the pivot shaft to a position corresponding to the bottom plate can be of an integrated structure.

In a third arrangement, the structure of the upper plate waterproof strip and the bottom plate waterproof strip is the same as that in the second arrangement. However, the arc-shaped grooves of the front cover and the rear cover are provided with the arc-shaped pivot shaft waterproof strip, and when the front cover and the rear cover are joined, the arc-shaped grooves are cooperated to form the ring-shaped pivot shaft waterproof strip enclosing the outer edge of the pivot shaft. In such situation, the U-shaped upper plate waterproof strip on the front cover, the side edge waterproof strip of the front cover at a position corresponding to the upper plate to a position corresponding to the pivot shaft, the arc-shaped pivot shaft waterproof strip, the side edge waterproof strip of the front cover at a position corresponding to the pivot shaft to a position corresponding to the bottom plate, and the U-shaped bottom plate waterproof strip are connected to each other as an integrated structure.

In addition to the above-mentioned structure, the pivot shaft waterproof strip may also be a ring-shaped pivot shaft waterproof strip provided outside the pivot shaft, which is connected with the adjacent side edge waterproof strip to form an integrated structure.

According to the present invention, the front cover and the rear cover can be made of a metal material. Such type of material is hard, which facilitates mounting the waterproof strip.

The front cover and/or the rear cover is provided with guide posts and/or guide holes. The front cover and the rear cover are mounted and fixed via the guide holes and the guide posts, and the main bracket is fixedly mounted to the front cover and/or the rear cover through the guide holes and the guide posts.

The waterproof light head structure provided according to the present invention is more convenient to mount and disassemble, compared with the existing waterproof light head structure. Only with the front cover and the rear cover removed, a complete non-waterproof light head structure can be formed, which can be used as an indoor stage light, with convenient mounting, maintaining and debugging. The waterproof structure according to the present invention is simple, while better waterproof performance is also guaranteed, with the internal structure simplified, which facilitates mounting and maintaining and has the advantages of both non-waterproof light head and waterproof light head structures, thus it is applicable in a wide range of scenarios.

DETAILED DESCRIPTION

The accompanying drawings of the present invention are for exemplary illustration only, and should not be construed as limitations on the present invention. In order to better illustrate the following embodiment, some parts in the accompanying drawings may be omitted, enlarged or reduced, and they do not represent the size of the actual product; for those skilled in the art, it is understandable that certain well-known structures and descriptions thereof in the drawings may be omitted.

Figure 1:
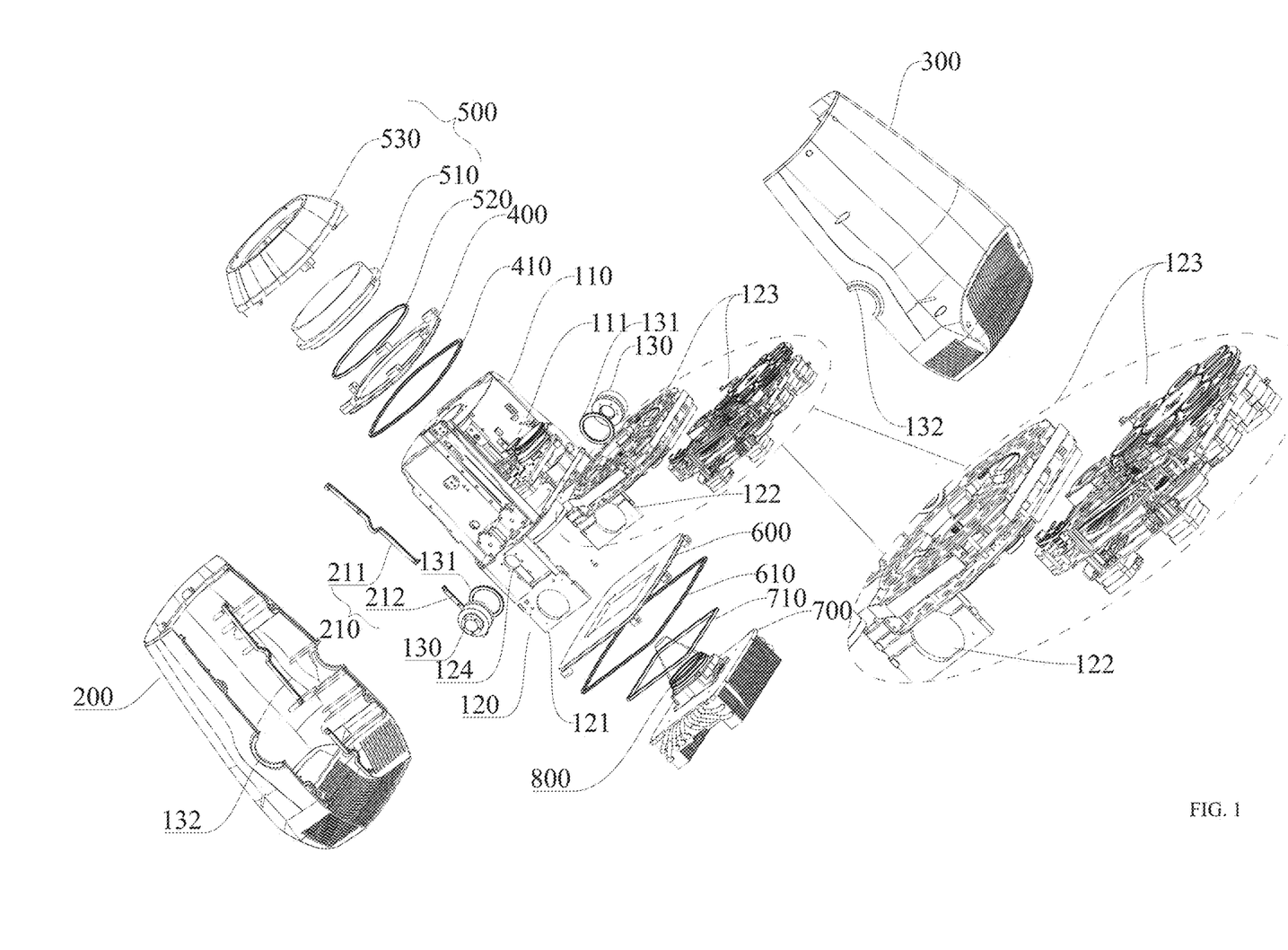
FIG. 1 is an exploded view of a waterproof light head structure according to the present invention.
Figure 2:
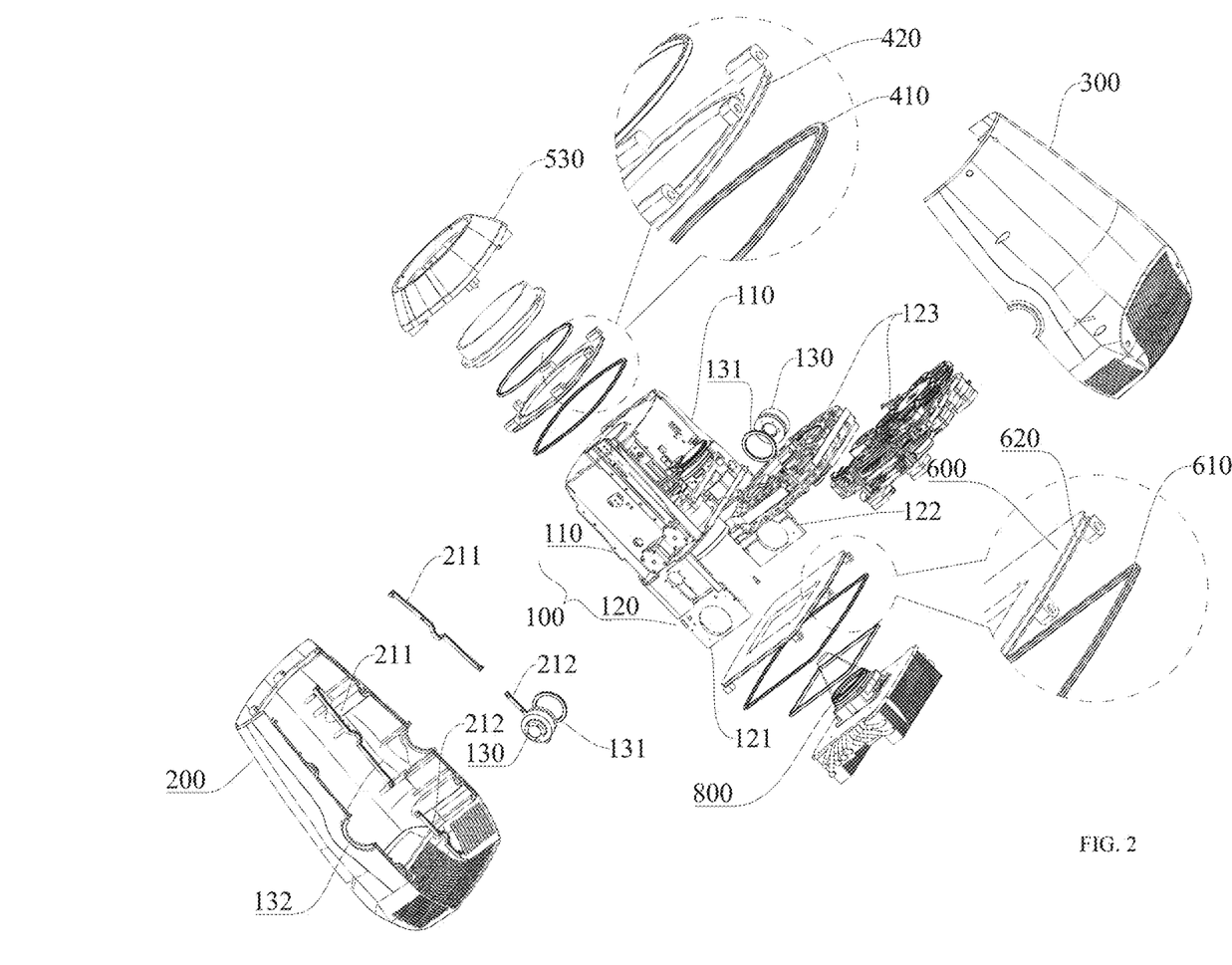
FIG. 2 is another exploded view of the waterproof light head structure according to the present invention.

As shown in FIG. 1 and FIG. 2, a waterproof light head structure is provided according to an embodiment of the present invention, which includes a main bracket 100, a front cover 200 and a rear cover 300 respectively arranged on the front side and the rear side of the main bracket 100, an upper plate 400 arranged above the main bracket 100, a bottom plate 600 arranged below the main bracket 100, a lens assembly 500 mounted on the main bracket 100 via the upper plate 400, a light source 800 arranged in the main bracket 100. The optical components are mounted on the main bracket 100. The front cover 200 and the rear cover 300 is joined to form a cavity. The main bracket 100 is arranged in the cavity. The front cover 200 and the rear cover 300 are respectively in sealed connection with the upper plate 400 and the bottom plate 600, and the side edges where the front cover 200 and the rear cover 300 are joined are in sealed connection to form an all-around waterproof structure. The front cover 200 and the rear cover 300 are in sealed connection along the sides between a position corresponding to the upper plate 400 of the light head and a position corresponding to the bottom plate 600 of the light head.

According to the present embodiment, the upper plate 400 is connected to the top end of the main bracket 100, the bottom plate 600 is connected to the bottom end of the main bracket 100, the upper plate 400 and the bottom plate 600 are also located in the cavity formed by joining the front cover 200 and the rear cover 300. When the front cover 200 and the rear cover 300 are joined, the front cover 200 and the rear cover 300 surround the upper plate 400 and are in sealed connection with the upper plate 400 at the upper portion of the light head, the front cover 200 and the rear cover 300 surround the bottom plate 600 and are in sealed connection with the bottom plate 600 at the lower portion of the light head, and the side edges where the front cover 200 and the rear cover 300 are joined are in sealed connection, thereby forming an all-around waterproof structure formed by the front cover 200, the rear cover 300, the upper plate 400 and the bottom plate 600.

In the process of achieving waterproof performance in the present embodiment, the front cover 200 and the rear cover 300 form a main stressed structure of fastening joint, and in the process of joining and fixing the front cover 200 and the rear cover 300, the waterproof performance of the overall structure is completed. Not only the waterproof performance of the light head structure is guaranteed, but also mounting and disassembling are more convenient and the structure is simple, compared with an existing waterproof light head structure. Importantly, when the front cover 200 and the rear cover 300 are removed, the main bracket 100, and the lens assembly 500 and the light source 800 correspondingly disposed on the main bracket 100 form a complete non-waterproof light head structure which can be used as an indoor stage light, with more convenient to mount, maintain and debug. Therefore, the present embodiment combines the advantages of a non-waterproof light. The switching between a complete waterproof light head and the complete non-waterproof light head thus can be realized by only replacing and removing the front cover 200 and the rear cover 300.

The main bracket 100 can include a support 120 at least for mounting an effect assembly 123 and a focusing total bracket 110 above the support 120 at least for mounting an optical lens assembly 111, the focusing total bracket 110 is connected to the upper end of the support 120. That is, the upper end of the support 120 is connected to the lower end of the focusing total bracket 110.

Preferably, the effect assembly 123 is mounted on the support 120 in a pluggable way. Specifically, the support 120 includes a left support side plate 121 and a right support side plate 122, and the effect assembly 123 is mounted between the left support side plate 121 and the right support side plate 122 in a pluggable way. By such pluggable way, mounting is more convenient.

When the lens assembly 500 includes a lens module 510 which is mounted on the upper plate 400, in order to improve the waterproof performance, the lens module 510 can be in sealed connection with the upper plate 400, thereby also achieving waterproofing at the end of the lens. Specifically, a lens module waterproof strip 520 is provided between the connection positions of the lens module 510 and the upper plate 400, and a lens module waterproof strip groove for mounting the lens module waterproof strip 520 is formed in the upper plate 400 or the lens module 510. In the embodiment shown in the FIGS. 1-2, the lens module waterproof strip groove is formed in the lens module. The lens module waterproof strip 520 is of a ring-shaped structure.

The lens assembly 500 further includes a lens ring 530 which is fixedly mounted on the upper plate 400, and an accommodating cavity for the lens module 510 is formed between the lens ring 530 and the upper plate 400. That is, the lens module 510 is sleeved with the lens ring 530, and the lower end of the lens ring 530 is fixedly mounted on the upper plate 400.

In this embodiment, the front cover 200 and the rear cover 300 are in sealed connection with the upper plate 400 by an upper plate waterproof strip 410.

A side surface of the upper plate 400 is provided with an upper plate waterproof strip groove 420 in which the upper plate waterproof strip 410 is mounted, and the front cover 200 and the rear cover 300 are provided with respective first protruding strips 201 engaged with the upper plate waterproof strip 410. The plane of the first protruding strip 201 facing the upper plate waterproof strip 410 forms a waterproof plane of the upper plate 400, and the waterproof plane of the upper plate 400 is abutted against the upper plate waterproof strip 410.

Similarly, the front cover 200 and the rear cover 300 are in sealed connection with the bottom plate 600 by a bottom plate waterproof strip 610.

A side surface of the bottom plate 600 is provided with a bottom plate waterproof strip groove 620 in which the bottom plate waterproof strip 610 is mounted, and the front cover 200 and the rear cover 300 are provided with respective second protruding strips 202 engaged with the bottom plate waterproof strip 610. The plane of the second protruding strip 202 facing the bottom plate waterproof strip 610 forms a waterproof plane of the bottom plate 600, and the waterproof plane of the bottom plate 600 is abutted against the bottom plate waterproof strip 610.

In this embodiment, a heat dissipation assembly 700 below the bottom plate 600 is further included, and the bottom plate 600 is in sealed connection with the heat dissipation assembly 700. The upper plate 400 and the bottom plate 600 each has a light hole, and the light source 800 is mounted on the upper surface of the heat dissipation assembly 700. Light emitted by the light source 800 thus is emitted out through the light hole of the bottom plate 600, the light hole of the upper plate 400 and the lens assembly 500 in sequence.

Specifically, a heat dissipation assembly waterproof strip 710 is provided between the bottom surface of the bottom plate 600 and the heat dissipation assembly 700, and in the horizontal direction, the heat dissipation assembly waterproof strip 710 is arranged between the light hole of the bottom plate 600 and the periphery of the bottom plate 600. Correspondingly, the bottom surface of the bottom plate 600 or the upper surface of the heat dissipation assembly 700 is provided with a heat dissipation assembly waterproof strip groove for mounting the heat dissipation assembly waterproof strip 710. The light source 800 is arranged at a position corresponding to the light hole of the bottom plate 600. The heat dissipation assembly waterproof strip 710 can be of a ring-shaped structure. The heat dissipation assembly 700 is fixedly connected to the bottom plate 600 via a fixing member, and the fixing position of the fixing member is disposed inside the heat dissipation assembly waterproof strip 710. The fixing member may include screws. With the heat dissipation assembly waterproof strip 710, a sealed space is formed between the light hole of the bottom plate 600 and the heat dissipation assembly 700, thus ensuring the waterproof performance at the side of the bottom plate 600.

Figure 3:
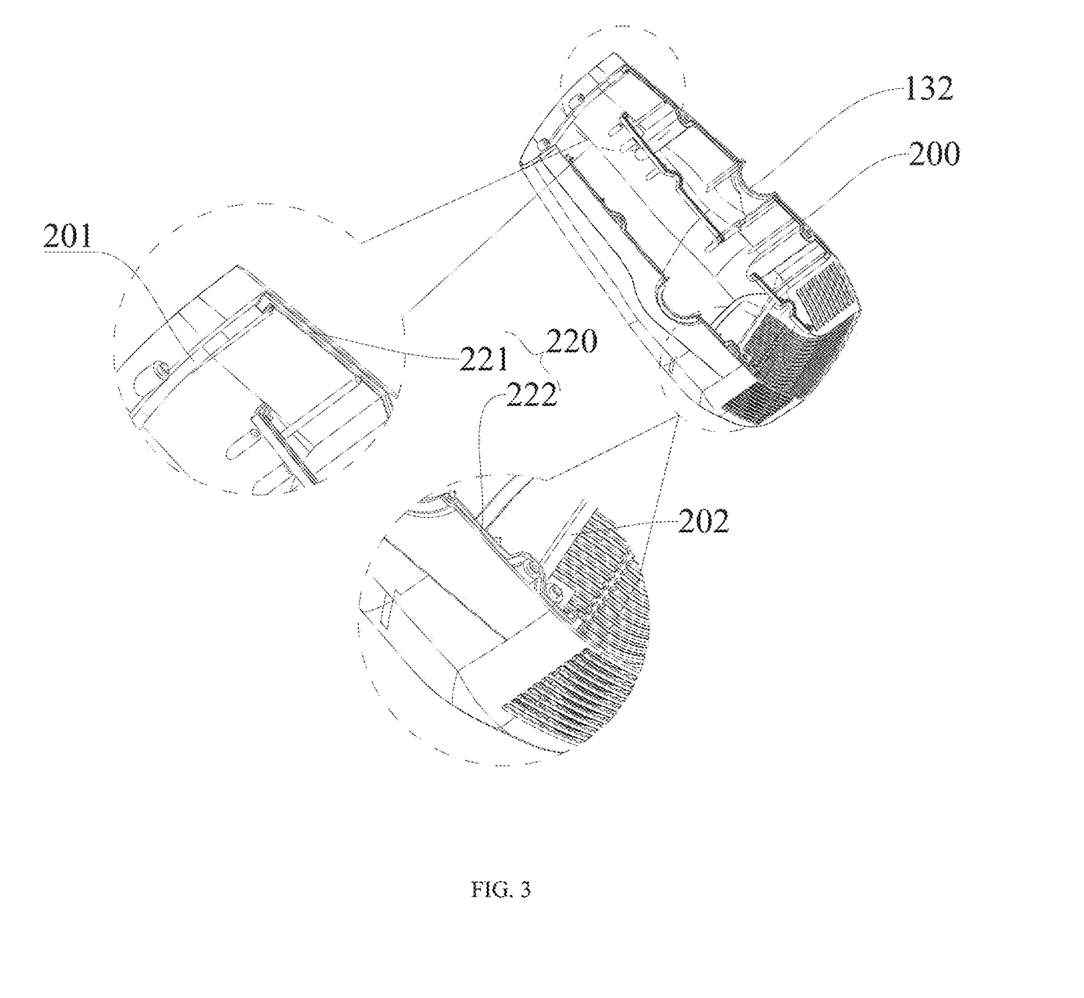
FIG. 3 is a structural schematic diagram and an enlarged view of a partial structure of a front cover of the waterproof light head structure according to the present invention.

According to the present embodiment, the side edges where the front cover 200 and the rear cover 300 are fastened to each other are in sealed connection through at least one side edge waterproof strip 210. As shown in FIG. 3, the edge of the front cover 200 is provided with a side edge waterproof strip groove 220 in which the side edge waterproof strip 210 is mounted, and a waterproof plane engaged with the side edge waterproof strip 210 is provided corresponding to the rear cover 300 at a position corresponding to the side edge waterproof strip 210. Conversely, the side edge waterproof strip groove 220 in which the side edge waterproof strip 210 is mounted can be provided in the rear cover 300, and the front cover 200 may be provided with a waterproof plane cooperating with the side edge waterproof strip 210 at a position corresponding to the side edge waterproof strip 210.

In this embodiment, respective pivot shafts 130 are mounted on the left and right sides of the main bracket 100, and the pivot shaft 130 is rotatably connected to an external U-shaped frame for driving the whole light head to rotate. The front cover 200 and the rear cover 300 are provided with respective arc-shaped grooves 132 at positions corresponding to the pivot shafts 130, and when the front cover 200 and the rear cover 300 are joined, the arc-shaped grooves 132 of the front cover 200 and the rear cover 300 are cooperated to form an avoidance hole for the pivot shaft 130 passing. Specifically, in this embodiment, the pivot shafts 130 are respectively mounted on the both sides of the support 120, and the pivot shaft 130 is provided with a wire through hole. Wiring holes 124 are formed in the left and right sides of the main bracket. The pivot shafts are respectively mounted on the main bracket corresponding to the position of the wiring holes 124. The wiring holes 124 facilitate passing wires for elements between the U-shaped frame and the inside of the light head structure.

The pivot shaft 130 is sealed to the front cover 200 and the rear cover 300 through a ring-shaped pivot shaft waterproof strip 131.

According to the present embodiment, the way to arrange the waterproof strip can be that: the upper plate waterproof strip 410 surrounding the periphery of the upper plate 400 is mounted in the upper plate waterproof strip groove 420, and the bottom plate waterproof strip 610 surrounding the periphery of the bottom plate 600 is mounted in the bottom plate waterproof strip groove 620, and the pivot shaft 130 is in sealed connection with the front cover 200 and the rear cover 300 via the separate ring-shaped pivot shaft waterproof strip 131. In such configuration, only the front cover 200 is required to be provided with the side edge waterproof strip groove 220 and the side edge waterproof strip 210 at a position corresponding to the upper plate 400 to a position corresponding to the pivot shaft 130, and at a position corresponding to the pivot shaft 130 to a position corresponding to the bottom plate 600, and the rear cover 300 is provided with the waterproof plane corresponding to the waterproof strip, as shown in FIG. 1 and FIG. 2.

In this embodiment, the front cover 200 and the rear cover 300 are made of a metal material. When the front cover 200 and the rear cover 300 are in sealed connection with the upper plate 400 via the upper plate waterproof strip 410, the side edge waterproof strip 210 may be abutted against the upper plate waterproof strip 410. When the front cover 200 and the rear cover 300 are in sealed connection with the bottom plate 600 through the bottom plate waterproof strip 610, the side edge waterproof strip 210 may be abutted against the bottom plate waterproof strip 610. When the pivot shafts 130 are mounted on the left and right sides of the main bracket 100, each pivot shaft 130 is sealed to the front cover 200 and the rear cover 300 via the pivot shaft waterproof strip 131, the side edge waterproof strip 210 may be abutted against the pivot shaft waterproof strip 131.

When the side edge waterproof strip 210 is abutted against the upper plate waterproof strip 410, the bottom plate waterproof strip 610, and/or the pivot shaft waterproof strip 131, the end of the side edge waterproof strip 210 is compressed and shortened by 1 mm-3 mm compared with that in non-abutted state, thus achieving waterproofing at the abutting position.

The front cover 200 and the rear cover 300 can be provided with respective guide posts and guide holes, so that the front cover 200 and the rear cover 300 are mounted and fixed via the guide holes and the guide posts, and the main bracket 100 may also be fixedly mounted to the front cover 200 and the rear cover 300 through the guide holes and the guide posts correspondingly disposed on the front cover 200 and the rear cover 300.

According to some embodiments, the sealed connection structures of the front cover 200 and the rear cover 300 and the upper plate 400 and the bottom plate 600, and the structure of the lens assembly 500 and the upper plate 400 can also be configured in the following manner.

In such configuration, each of the front cover 200 and the rear cover 300 is provided with an upper plate waterproof strip groove 420 corresponding to the upper plate 400, a respective upper plate waterproof strip 410 is mounted in the upper plate waterproof strip groove 420, and when the front cover 200 and the rear cover 300 are joined, the upper plate waterproof strips 410 of the front cover 200 and the rear cover 300 are cooperated to enclose the periphery of the upper plate 400.

Similarly, each of the front cover 200 and the rear cover 300 is provided with a bottom plate waterproof strip groove 620 corresponding to the bottom plate 600, a respective bottom plate waterproof strip 610 is mounted in the bottom plate waterproof strip groove 620, and when the front cover 200 and the rear cover 300 are joined, the bottom plate waterproof strips 610 of the front cover 200 and the rear cover 300 are cooperated to enclose the periphery of the bottom plate 600.

The lens assembly 500 may include a lens module 510 and a lens base plate 600 which are integrated, and the upper plate 400 is formed by the lens base plate 600 of the lens assembly 500. When the lens assembly 500 is the integrated waterproof lens assembly 500 with the lens base plate 600, the bottom plate 600 is the upper plate 400, sealing of one end of the lens can also be achieved, with the front cover 200 and the rear cover 300 in sealed connection with the bottom plate 600.

According to some embodiments, the pivot shaft waterproof strip can be configured in the following manner. the arc-shaped pivot shaft waterproof strip 131 is provided on each arc-shaped groove 132 of the front cover 200 and the rear cover 300, so that when the front cover 200 and the rear cover 300 are joined, the respective pivot shaft waterproof strip 131 mounted in the two arc-shaped grooves 132 is cooperated to enclose the pivot shaft 130 to seal the periphery of the pivot shaft 130.

In addition to the above-mentioned way, it can also be configured in such a way that a ring-shaped pivot shaft waterproof strip 131 is provided on the arc-shaped groove 132 of the front cover 200 or the arc-shaped groove 132 of the rear cover 300, so that the pivot shaft 130 is sealed to the front cover 200 and the rear cover 300 via the ring-shaped pivot shaft waterproof strip 131.

Figure 4:
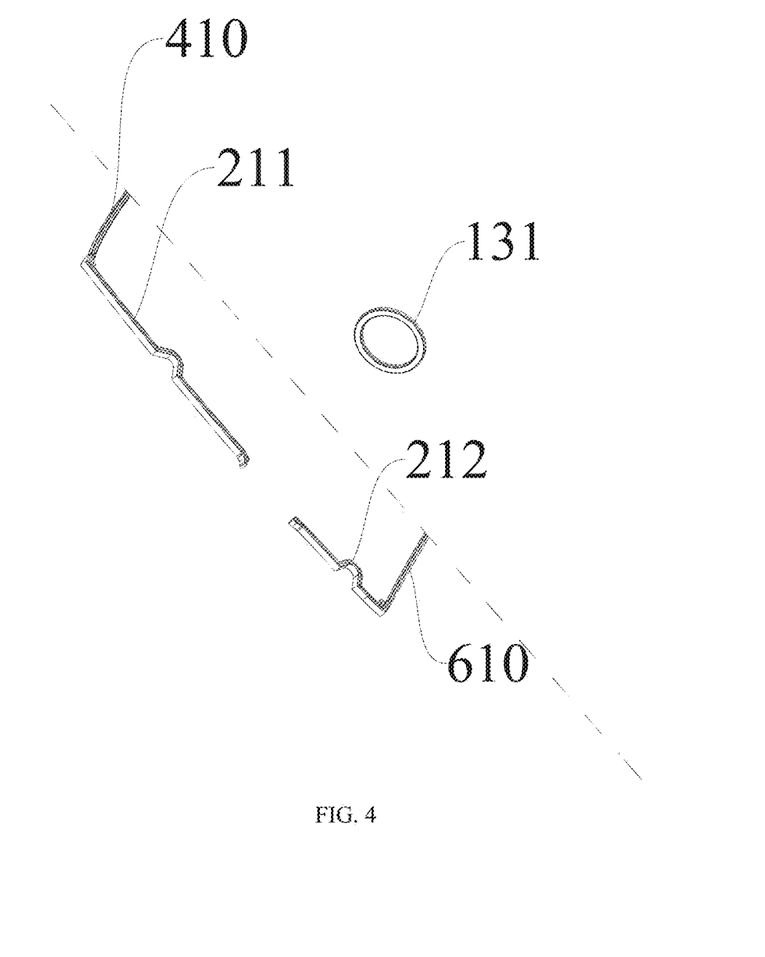
FIG. 4 is a first schematic diagram of a partial structure of a waterproof strip on the front cover of the waterproof light head structure according to the present invention.
Figure 5:
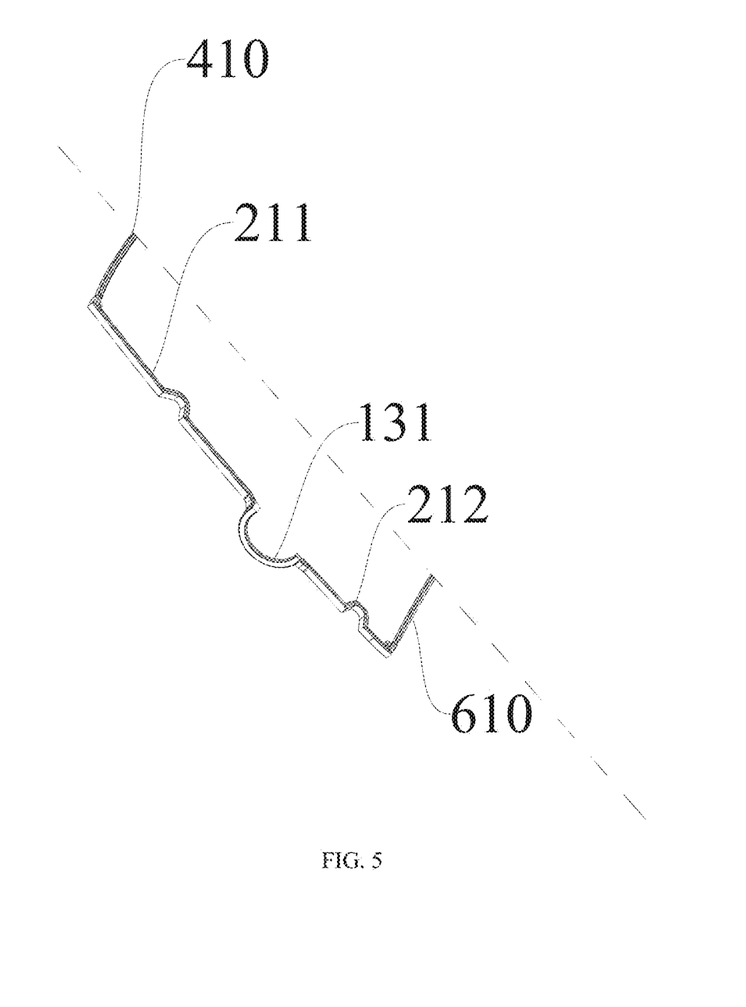
FIG. 5 is a second schematic diagram of the partial structure of the waterproof strip on the front cover of the waterproof light head structure according to the present invention.
Figure 6:
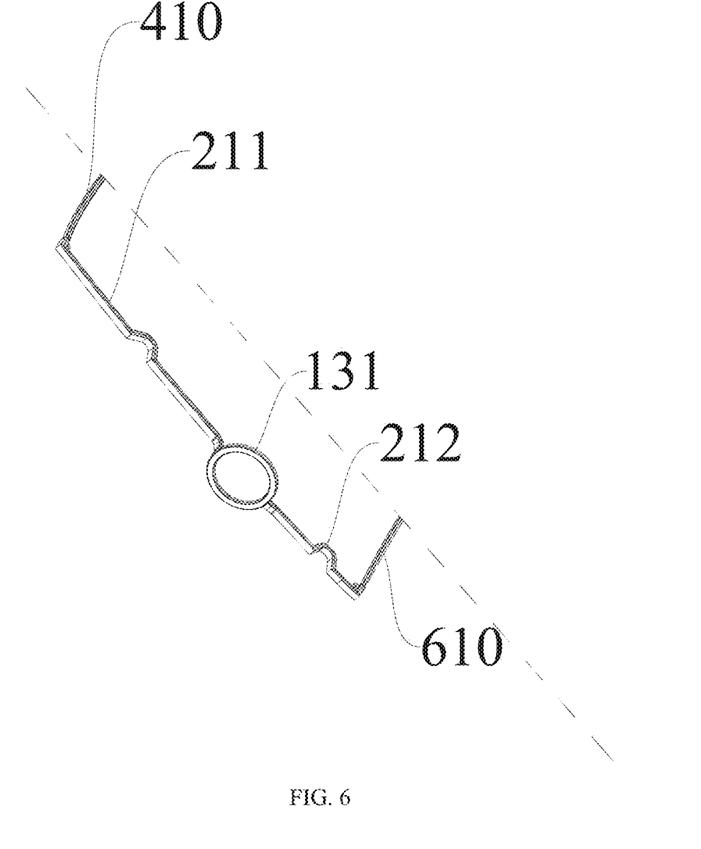
FIG. 6 is a third diagram of the partial structure of the waterproof strip on the front cover of the waterproof light head structure according to the present invention.

According to some embodiments, as FIGS. 4-6 shown, the side edge waterproof strip 210 can be integrally formed with the upper plate waterproof strip 410, or the bottom plate waterproof strip 610, or the pivot shaft waterproof strip 131. Specifically, when the side edges of the front cover 200 and the rear cover 300 are in sealed connection via the side edge waterproof strip 210, and the front cover 200 and the rear cover 300 are in sealed connection with the upper plate 400 via the upper plate waterproof strip 410, the side edge waterproof strip 210 can be integrally formed with the upper plate waterproof strip 410. When the front cover 200 and the rear cover 300 are in sealed connection with the bottom plate 600 through the bottom plate waterproof strip 610, the side edge waterproof strip 210 can be integrally formed with the bottom plate waterproof strip 610. When the pivot shafts 130 are mounted on the left and right sides of the main bracket 100, and each pivot shaft 130 is sealed to the front cover 200 and the rear cover 300 via the pivot shaft waterproof strip 131, the side edge waterproof strip 210 can also be integrally formed with the pivot shaft waterproof strip 131.

Specifically, the pivot shafts 130 are respectively mounted on the left and right sides of the main bracket 100, and each pivot shaft 130 is rotatably connected to an external U-shaped frame for driving the whole light head to rotate. The side edges where the front cover 200 and the rear cover 300 are joined are provided with the side edge waterproof strip 210. The upper plate waterproof strip 410, the bottom plate waterproof strip 610 and/or the pivot shaft waterproof strip 131 are arranged on the front cover 200 and/or the rear cover 300, which can be of an integrated structure with the corresponding side edge waterproof strip 210.

The waterproof strip of the integrated structure at least includes the following Exemplary arrangement.

As shown in FIG. 4, the front cover 200 and the rear cover 300 are each provided with a U-shaped upper plate waterproof strip groove 420 and a U-shaped upper plate waterproof strip 410, when the front cover 200 and the rear cover 300 are joined, the upper plate waterproof strip 410 completely encloses the periphery of the upper plate 400. The separate ring-shaped pivot shaft waterproof strip 131 is arranged outside the pivot shaft 130. The bottom plate waterproof strip 610 is in same arrangement as the upper plate waterproof strip 410. In such situation, the U-shaped upper plate waterproof strip 410 on the front cover 200 and a side edge upper waterproof strip 211 can be of an integrated structure, the side edge upper waterproof strip 211 is the waterproof strip of the front cover 200 from the position corresponding to the upper plate 400 to the position corresponding to the pivot shaft 130. The front cover 200 is provided with a corresponding side edge upper waterproof strip groove 221, and the rear cover 300 is provided with a waterproof plane corresponding to the side edge upper waterproof strip 211. The U-shaped bottom plate waterproof strip 610 on the front cover 200 and a side edge lower waterproof strip 212 can be of an integrated structure, the side edge lower waterproof strip 212 is a waterproof strip of the front cover 200 from the position corresponding to the pivot shaft 130 to the position corresponding to the bottom plate 600. A corresponding side edge lower waterproof strip groove 222 is disposed on the front cover 200, and a waterproof plane corresponding to the side edge upper waterproof strip 211 is disposed on the rear cover 300.

As shown in FIG. 5, the upper plate waterproof strip 410 and the bottom plate waterproof strip 610 have the same structure as FIG. 4 shown. However, the arc-shaped grooves 132 of the front cover 200 and the rear cover 300 are each provided with the arc-shaped pivot shaft waterproof strip 131, when the front cover 200 and the rear cover 300 are joined, the ring-shaped pivot shaft waterproof strips 131 of the front cover 200 and the rear cover 300 are cooperated to completely enclose the periphery of the pivot shaft 131. In this situation, the U-shaped upper plate waterproof strip 410 on the front cover 200, the side edge upper waterproof strip 211, the arc-shaped pivot shaft waterproof strip 131, the side edge lower waterproof strip 212, and the U-shaped bottom plate waterproof strip 610 are connected to each other as an integrated structure.

As shown in FIG. 6, in addition to the above-mentioned structure, the pivot shaft waterproof strip 131 may also be the ring-shaped pivot shaft waterproof strip 131 disposed on the arc-shaped groove 132 of the front cover 200 or the rear cover 300, which is connected with the adjacent side edge upper waterproof strip 211 and/or side edge lower waterproof strip 212 to form an integrated structure.

Obviously, the above-mentioned embodiments of the present invention are only examples for clearly illustrating the technical solutions of the present invention, rather than limiting the specific implementation modes of the present invention. Any modifications, equivalent replacements and improvements made within the spirit and principles of claims of the present invention shall be included within the protection scope of the claims of the present invention.

The invention claimed is:
1. A waterproof light head structure, comprising
a main bracket;
a front cover and a rear cover respectively arranged on a front side and a rear side of the main bracket, and joined to each other to form a cavity, wherein the main bracket is arranged in the cavity;
an upper plate connected to an upper end of the main bracket;

a bottom plate connected to a bottom end of the main bracket;

a lens assembly mounted on the main bracket via the upper plate; and a light source arranged in the main bracket and connected to the main bracket via the bottom plate, light emitted by the light source being output through the lens assembly, wherein the lens assembly, the main bracket, and the light source together form a complete structure; the front cover and the rear cover are both in sealed connection with the upper plate and the bottom plate, and side edges where the front cover and the rear cover are joined to each other are in sealed connection along an entire length direction of the front cover and the rear cover.

2. The waterproof light head structure according to claim 1, wherein the lens assembly comprises a lens module and a lens base plate which are integrated, the upper plate is formed by the lens base plate of the lens assembly.

3. The waterproof light head structure according to claim 1, wherein the lens assembly comprises a lens module, and the lens module is in direct sealed connection with the upper plate.

4. The waterproof light head structure according to claim 1, wherein the front cover and the rear cover are in sealed connected with the upper plate through an upper plate waterproof strip.

5. The waterproof light head structure according to claim 4, wherein the upper plate is provided with an upper plate waterproof strip groove, the upper plate waterproof strip is mounted in the upper plate waterproof strip groove, and the front cover and the rear cover are respectively provided with a first protruding strip corresponding to the upper plate waterproof strip.

6. The waterproof light head structure according to claim 4, wherein each of the front cover and the rear cover is provided with an upper plate waterproof strip groove corresponding to the upper plate, the upper plate waterproof strip is mounted in the respective upper plate waterproof strip groove, and when the front cover and the rear cover are joined, the upper plate waterproof strip of the front cover and the rear cover is cooperated to enclose a periphery of the upper plate.

7. The waterproof light head structure according to claim 1, wherein the front cover and the rear cover are in sealed connection with the bottom plate through a bottom plate waterproof strip.

8. The waterproof light head structure according to claim 7, wherein the bottom plate is provided with a bottom plate waterproof strip groove, the bottom plate waterproof strip is mounted in the bottom plate waterproof strip groove, and the front cover and the rear cover are respectively provided with a second protruding strip corresponding to the bottom plate waterproof strip.

9. The waterproof light head structure according to claim 7, wherein each of the front cover and the rear cover is provided with a bottom plate waterproof strip groove corresponding to the bottom plate, the bottom plate waterproof strip is mounted in the respective bottom plate waterproof strip groove, and when the front cover and the rear cover are joined, the bottom plate waterproof strip of the front cover and the rear cover is cooperated to enclose a periphery of the bottom plate.

10. The waterproof light head structure according to claim 1, further comprising a heat dissipation assembly below the bottom plate, the bottom plate being in sealed connection with the heat dissipation assembly;

wherein the upper plate and the bottom plate each has a light hole, the light source is mounted on an upper surface of the heat dissipation assembly, the light emitted by the light source thus is output through the light hole of the bottom plate, the light hole of the upper plate and the lens assembly in sequence.

11. The waterproof light head structure according to claim 10, wherein a heat dissipation assembly waterproof strip is provided between a bottom surface of the bottom plate and the heat dissipation assembly, and the heat dissipation assembly waterproof strip is arranged between the light hole of the bottom plate and a periphery of the bottom plate; and the bottom surface of the bottom plate or an upper surface of the heat dissipation assembly is provided with a heat dissipation assembly waterproof strip groove for correspondingly mounting the heat dissipation assembly waterproof strip.

12. The waterproof light head structure according to claim 1, wherein each of left and right sides of the main bracket is provided with a pivot shaft, which is rotatably connected to an external U-shaped frame for driving the whole waterproof light head to rotate; and wherein the front cover and the rear cover are each provided with an arc-shaped groove corresponding to the respective pivot shaft, and when the front cover and the rear cover are joined, the arc-shaped groove of the front cover and the rear cover is cooperated to form an avoidance hole for the pivot shaft.

13. The waterproof light head structure according to claim 12, wherein each arc-shaped groove is provided with an arc-shaped pivot shaft waterproof strip, and when the front cover and the rear cover are joined, the pivot shaft waterproof strip disposed on the respect arc-shaped groove is cooperated to enclose the pivot shaft to seal outside of the pivot shaft.

14. The waterproof light head structure according to claim 12, wherein a ring-shaped pivot shaft waterproof strip is provided outside the pivot shaft, and the pivot shaft is sealed to the front cover and the rear cover via the ring-shaped pivot shaft waterproof strip.

15. The waterproof light head structure according to claim 1, wherein the main bracket comprises a support at least for mounting an effect assembly and a focusing total bracket at least for mounting an optical lens assembly, the focusing total bracket being connected to an upper end of the support.

16. The waterproof light head structure according to claim 1, wherein the side edges where the front cover and the rear cover are fastened to each other are in sealed connection through a side edge waterproof strip.

17. The waterproof light head structure according to claim 16, wherein the front cover and the rear cover are in sealed connection with the upper plate via an upper plate waterproof strip, and the side edge waterproof strip is abutted against with the upper plate waterproof strip or is integrally formed with the upper plate waterproof strip; or the front cover and the rear cover are in sealed connection with the bottom plate through a bottom plate waterproof strip, and the side edge waterproof strip is abutted against with the bottom plate waterproof strip or is integrally formed with the bottom plate waterproof strip; or a pivot shaft is mounted on each of left and right sides of the main bracket, the pivot shaft is sealed to the front cover and the rear cover via a pivot shaft waterproof strip, and the side edge waterproof strip is abutted against the pivot shaft waterproof strip or is integrally formed with the pivot shaft waterproof strip.

18. The waterproof light head structure according to claim 17, wherein when the side edge waterproof strip is abutted against the upper plate waterproof strip, the bottom plate waterproof strip, or the pivot shaft waterproof strip, an end of the side edge waterproof strip is compressed and shortened by 1 mm-3 mm compared with that in a non-abutted state.

* * * * *